(12) United States Patent
Steinlechner et al.

(10) Patent No.: US 6,820,030 B2
(45) Date of Patent: Nov. 16, 2004

(54) METHOD AND DEVICE FOR DETERMINING A ROTATION ANGLE OR A DISPLACEMENT

(75) Inventors: Siegbert Steinlechner, Leonberg (DE); Axel Wenzler, Leonberg (DE); Klaus Marx, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/432,077

(22) PCT Filed: Jun. 6, 2002

(86) PCT No.: PCT/DE02/02052
§ 371 (c)(1),
(2), (4) Date: May 19, 2003

(87) PCT Pub. No.: WO03/004974
PCT Pub. Date: Jan. 16, 2003

(65) Prior Publication Data
US 2004/0010928 A1 Jan. 22, 2004

(30) Foreign Application Priority Data
Jul. 5, 2001 (DE) ......................... 101 32 685

(51) Int. Cl.[7] ........................ G01C 17/00; G01C 19/00
(52) U.S. Cl. ..................................................... 702/151
(58) Field of Search ................................. 702/150, 151, 702/127

(56) References Cited

U.S. PATENT DOCUMENTS

| 4,884,226 | A | * | 11/1989 | Sakano ...................... 702/151 |
| 4,991,125 | A | | 2/1991 | Ichikawa |
| 6,029,118 | A | * | 2/2000 | Strasser ...................... 702/94 |
| 6,470,292 | B1 | * | 10/2002 | Tanaka et al. .............. 702/150 |
| 6,484,120 | B1 | * | 11/2002 | Goto et al. ................. 702/151 |
| 2002/0173931 | A1 | * | 11/2002 | Dudler et al. .............. 702/151 |

FOREIGN PATENT DOCUMENTS

| DE | 1 004 260 | | 3/1957 |
| DE | 42 17 498 | A | 12/1993 |
| DE | 195 06 938 | A | 8/1996 |
| DE | 195 06 938 | A1 | 8/1996 |
| JP | 08 304113 | A | 11/1996 |

* cited by examiner

Primary Examiner—Demetrius R. Pretlow
(74) Attorney, Agent, or Firm—Michael J. Striker

(57) ABSTRACT

A method for determining a rotation angle or a path, with the following steps:

measurement of at least two phase values $\alpha_1$, $\alpha_2$ through the scanning of sensors that are associated with the respective phase values and have different periodicities, calculation of a working value k, which can be represented as a whole number, on the basis of the measured phase values $\alpha_1$ and the periodicities $n_i$ associated with them, calculation of at least two scaled estimates $\phi_{s1}/2\pi$ on the basis of the phase values $\alpha_i$, the periodicities $n_i$, the working value k, and integral working factors $k_i$ that set the periodicities $n_i$ in relation to one another in a scaling relation, and weighted summation of the scaled estimates $\phi_{s1}/2\pi$ in order to obtain a determined estimate $\Phi_{meas}/2\pi$.

9 Claims, 3 Drawing Sheets

METHOD AND DEVICE FOR DETERMINING A ROTATION ANGLE OR A DISPLACEMENT

BACKGROUND OF THE INVENTION

The current invention relates to a method and a device for determining an angle of rotation or a path.

SUMMARY OF THE INVENTION

In various applications, particularly in devices intended to aid in determining the angular position of a rotatable shaft, it is desirable to know the precise angular position of the shaft. This requirement can be fulfilled, for example, with the aid of analog angle sensors, for example potentiometers, which after being turned on, immediately output the current angular position value in the form of a voltage in every position.

If devices of this kind are used for angular measurement of angular ranges greater than 360°, the problem arises that it is no longer possible to determine which rotation the shaft is currently in. In order to evaluate angular ranges that are greater than 360°, however, incremental measuring transmitters can be used, in which the angular position is determined through forward and backward counting of pulses.

Such incremental measuring transmitters, however, cannot execute absolute angle measurement because it is only possible to count increments that have passed by a receiver.

In some technical measuring tasks, the use of incremental measuring transmitters generates phase measurement values; the values that are actually to be measured, such as an angle, a path, or a distance, must be determined from these phase measurement values. In order to increase the range of unambiguity (corresponding to a phase range from 0–2π) it is possible to use at least one other measurement conduit with a different phase slope and to derive a greater unambiguity range from a suitable combination of measurement values.

Examples of this include distance measurement using RADAR or modulated laser light. In these instances, N measurements are executed at different frequencies $f_1, \ldots f_N$. At the reception point, the signals reflected from a target at a distance x have the following phase shifts (c=the speed of light):

$$\alpha_i = \frac{2 \cdot \pi \cdot f_i \cdot 2 \cdot x}{c}$$

The phase shifts are thus proportional to the value that is to be measured and proportional to the frequency used. However, the actual measurement values of the phases always lie in the range from 0 to 2π, i.e. are always determined, with the sole exception of integral multiples of 2π.

Another example that should be mentioned is an optical angular sensor. In this case, a scan of N optical line gratings is executed, where N tracks with optical line gratings are placed on a disk or a cylinder. There are $n_i$ periods or lines in one rotation. If the phase positions of the tracks are measured in relation to a fixed measurement window with the aid of optoelectronic detectors, this yields the following phase lengths:

$$\alpha_i = (n_i \phi) \text{ modulo } (2\pi).$$

The phases are thus proportional to the rotation angle φ and the periodicities. Here, too, the actual measurement values of the phases always lie in the range from 0 to 2π.

Finally, multiple wave interferometry should also be mentioned. Here, too, for example paths x are measured through the use of at least two different light wavelengths $\lambda_i$, which yields an increased unambiguity range of $$\Lambda = \frac{\lambda_2 \cdot \lambda_1}{\lambda_2 - \lambda_1}.$$

Here, too, an appropriate dimensioning yields a phase path of the kind indicated above.

The evaluation of the signals obtained with methods of this kind, i.e. the determination of x and φ, is carried out using vernier methods.

In the classic vernier method, the difference is calculated between two phase signals, where for the case in which this difference is less than zero, 2π is added. This method has significant limitations since measurement errors in the phases have full impact on the end result. Furthermore, a method of this kind functions only if the two periodicities under consideration differ by precisely 1.

DE-OS 195 06 938 has disclosed a modified vernier method in which the value of a variable to be measured is determined from two phase signals through weighted addition and through the further addition of an angle range-dependent constant. This method excels in its capacity for significantly reducing measurement errors in the phase signals. For this method, too, however, it is necessary that the two periodicities under consideration differ by precisely 1.

Finally, DE-P 1004260 has disclosed a method for determining a rotation angle or distance through the evaluation of phase measurement values. In this method, the phase values that are measured in an N-dimensional space are mapped as N−1 new signals $S_i$ by means of a linear transformation A. These signals $S_i$ are transformed with the aid of a quantizing mechanism into corresponding integral values $W_i$ and are converted by means of a linear mapping C into N real values $Z_i$. Weighted phase measurement values $\alpha_i$ modulo 2π are added to these values, yielding N estimates for the angle π to be measured. The N estimates are corrected if need be at their discontinuity points and are added up in a weighted fashion taking their phase angles into account.

The object of the invention is to supply, through the simplest means possible, measurement values for distances x and angles φ on the basis of at least two phase measurement values. It should as a result no longer be necessary to abide by the requirement in the conventional method that the two periodicities must differ by precisely 1.

The invention provides for a particularly simple method, which can reliably determine measurement values that are to be determined, e.g. an angle φ or a path or distance x. By contrast with conventional methods, there is a large degree of freedom in the selection of periodicities for the determination of at least two phase signals. The weighting of the individual measurement values or estimates in the manner that is provided according to the invention has turned out to be particularly easy to execute, computationally speaking.

According to a first embodiment of the method according to the invention, for the case in which two phase values $\alpha_1$, $\alpha_2$ are supplied, the working value k, which is used in the process of determining a rotation angle or a path, is calculated by rounding the term:

$$\left[ \frac{\alpha_1 \cdot n_2 - \alpha_2 \cdot n_1}{2 \cdot \pi} \right].$$

In this case, two phase values $\alpha_1$, $\alpha_2$ are evaluated, which are respectively obtained from sensors or measuring transmitters that each have $n_1$ and $n_2$ periods. Computationally speaking, it is easy to carry out the generation and use of such a working value based on two phase values. In this instance, the rounding is the replacement of the calculated value with the nearest smaller or larger whole number. The deviation of the calculated term from the nearest whole number is a measure of the achievable precision of the method.

A scaling relation between the periodicities $n_1$, $n_2$ is suitably selected to be an equation with the form $$k_2 \cdot n_1 - k_1 \cdot n_2 = 1$$

Of the infinite number of solution pairs $k_1$, $k_2$, the one with the smallest numerical values is advantageously used.

According to a particularly preferable embodiment of the method according to the invention, the at least two scaled estimates are calculated in the form $$\frac{\Phi s_i}{2 \cdot \pi} = \frac{\frac{\alpha_i}{2 \cdot \pi} + k \cdot k_i}{n_i},$$

where $i = 1, 2 \ldots N$, and $k$ = the working value.

It is also preferable that the weighted summation of the at least two scaled estimates for obtaining a determined estimate $\Phi_{meas}$ be carried out in the form $$\frac{\Phi_{meas}}{2 \cdot \pi} = \sum_{i=1}^{N} \left[ \frac{\Phi s_i}{2 \cdot \pi} \cdot g_i \right]_{mod(1)}$$

where the $g_i$'s ($i = 1, 2 \ldots N$) represent the weighting factors for which $\Sigma g_i = 1$.

The calculated sum must be taken as modulo 1 (i.e. only the number of decimals need be taken into consideration). It turns out that the resulting estimate $\Phi_{meas}$ for the angle $\Phi$ to be measured can be produced in a very precise and reliable fashion.

In the case of two phase measurement values, it is suitable to set the weighting factors $g_1$, $g_2$ each equal to 0.5. This setting turns out to be sufficiently precise for a large number of uses.

According to another preferred embodiment of the method according to the invention, an improvement in the precision of the estimate $\Phi_{meas}$ with similarly probable additive measurement errors in $\alpha_1$ and $\alpha_2$ is achieved if the weighting factors are produced in the form:

$$g_i = \frac{n_i^2}{\sum_{1}^{N} n_i^2}.$$

This weighting is optimal for the purpose of a minimal square of error. This weighting turns out to be very suitable particularly for systems with more than two phase signals to be evaluated, i.e. for $N > 2$.

According to another preferred embodiment, the weighting factors are produced in the form $$g'_i = \frac{n_i \cdot w_i}{2^q} \text{ with } \sum_{i=1}^{N} w_i n_i = 2^q,$$

where the $w_i$'s represent whole numbers and are selected in such a way that the weights $g'_i$ come as close as possible to the ideal weight $g_i$. The natural number q here determines the achievable precision. This selection of the weighting factors turns out to be particularly easy to execute in terms of computation since in the generation of this kind of weighting factors, the division by the term $$\sum_{1}^{N} n_i^2$$

or the multiplication by the reciprocal value of this term is eliminated. Only a division by the power of two $2^q$ is required here, which in a two's complement depiction, can be achieved computationally through a simple digit shift by q places to the right. The summation is suitably calculated with q bits, without regard to subtotal arithmetic overflows.

Preferred embodiments of the invention will now be explained in detail in conjunction with the accompanying drawings.

DESCRIPTION OF THE PREFERRED EMBODIMENTS

Figure 1:
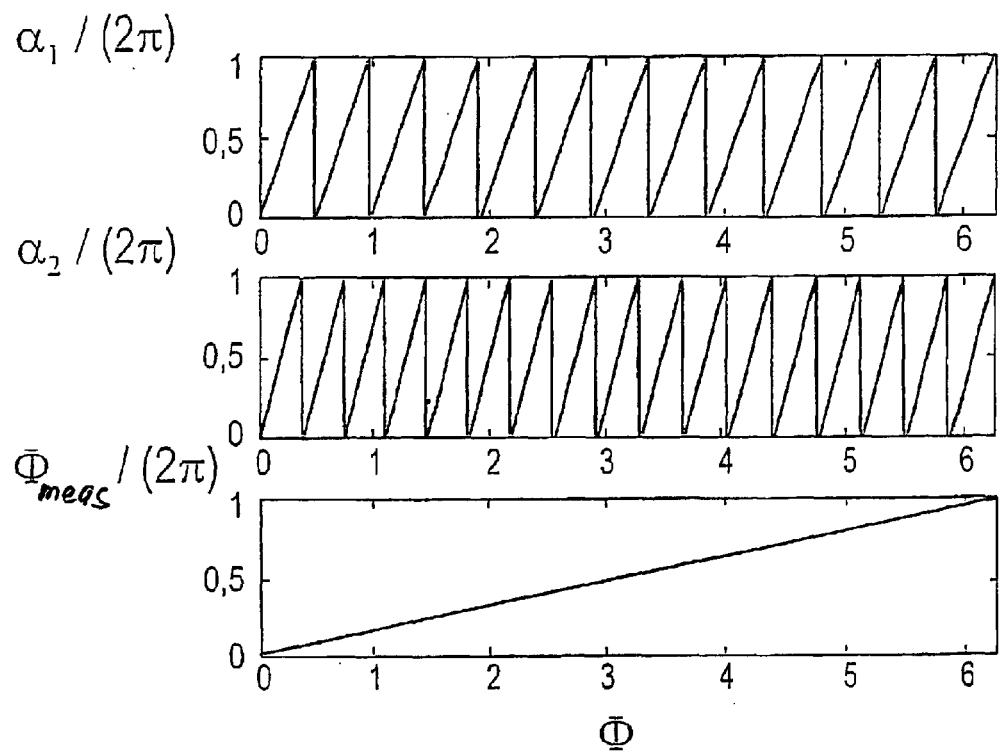
FIG. 1 is a diagram for depicting an estimate $\Phi_{meas}$ that can be generated on the basis of two phase signals $\alpha_1$, $\alpha_2$ by means of the method according to the invention.

First, the method according to the invention will be explained in conjunction with FIG. 1 in an example of two phase measurement values $\alpha_1$, $\alpha_2$ ($N = 2$) being considered simultaneously.

Sensing means, for example an optical angle sensor with two tracks, delivers two measured phase values $\alpha_1$, $\alpha_2$. The two tracks have an $n_1$-periodic or $n_2$-periodic structure. The values $n_1$ and $n_2$ are the periodicities of the individual tracks. It should first be assumed that $n_1$ and $n_2$ are prime. These structures can be achieved, for example, through the use of intrinsically known line gratings. The phase values $\alpha_1$ and $\alpha_2$ in the top two rows in FIG. 1 are plotted by way of example for $n_1 = 13$ and $n_2 = 17$ in relation to the actual angle $\Phi$ to be measured (each scaled to 1 through division by $2\pi$). If the mechanical rotation angle $\Phi$ to be determined passes through a rotation (360° or $2\pi$), then the phase values $\alpha_1$ and $\alpha_2$ pass $n_1$ and $n_2$ times through their respective measuring range.

Based on the phase values $\alpha_1$, $\alpha_2$, which as a rule are in digital form, a whole number k is determined as a working value in a first step according to the equation:

$$k = \text{the rounding of } \left[ \frac{\alpha_1 \cdot n_2 - \alpha_2 \cdot n_1}{2 \cdot \pi} \right] \quad \text{(equation (1))}$$

The term "rounding" is understood here to mean the rounding up or down to the nearest whole number. In a second step, two scaled estimates $\phi_{s1}/2\pi$ and $\phi_{s2}/2\pi$ are determined for the value $\phi$ to be determined:

$$\frac{\Phi S_1}{2\cdot\pi} = \frac{\frac{\alpha_1}{2\cdot\pi}+k\cdot k_1}{n_1} \quad \text{(equation (2))}$$

$$\frac{\Phi S_2}{2\cdot\pi} = \frac{\frac{\alpha_2}{2\cdot\pi}+k\cdot k_2}{n_2}.$$

In this case, $k_1$ and $k_2$ are fixed factors, which only have to be determined once for given periodicities. More precisely stated, $k_1$ and $k_2$ are arbitrary integral solutions of the equation $$k_2 \cdot n_1 - k_1 \cdot n_2 = 1. \quad \text{(equation (3))}$$

Of the infinite number of solutions, for example the ones with the lowest numerical values can be assumed. For example, for the periodicities $n_1=13$ and $n_2=17$, logical solutions are $k_1=3$ and $k_2=4$.

In a third step, a weighted summation of the scaled estimates with the weighting factors $g_1$ and $g_2$ is executed, where after the summation, the result modulo 1 is to be taken (i.e. only the number of decimals). The final estimate $\Phi_{meas}$ for the angle $\Phi$ to be determined is generated according to the equation $$\frac{\Phi_{meas}}{2\cdot\pi} = \left[\frac{\Phi_{s1}}{2\cdot\pi}\cdot g_1 + \frac{\Phi_{s2}}{2\cdot\pi}\cdot g_2\right]_{\mathrm{mod}(1)}. \quad \text{(equation (4))}$$

For the weighting factors, the equation $g_1+g_2=1$ must apply. In many applications, weighting factors of this kind are each set equal to 0.5. An improvement with similarly probable additive measurement errors in $\alpha_1$ and $\alpha_2$ is achieved if one uses the weighting according to the equation:

$$g_i = \frac{n_i^2}{\sum_{1}^{N} n_i^2}, \quad \text{(equation (5))}$$

which is optimal for the purpose of a minimal square of error. N is the number of simultaneously considered phase measurement values; in the current example, N=2.

The first two rows in FIG. 1 have already been explained. The third row depicts an estimate $\Phi_{meas}$ determined with the method according to the invention for the above-mentioned example $n_1=13$ and $n_2=17$, plotted over the mechanical angle $\Phi$.

The weighting mentioned above has the advantage that the determination of the scaled estimates $\phi_{s1}/2\pi$ and $\phi_{s2}/2\pi$ does not explicitly have to be carried out. It is sufficient to determine the respective numerators of the fractions on the right side of equation (2). It is no longer necessary to divide by $n_1$ and $n_2$ since the weighting factors $g_i$ in equation (5) contain the terms $n_1^2$ and $n_2^2$ in the numerator.

A particularly simple embodiment is obtained if the weighting factors undergo a further slight variation so that it is also no longer necessary to divide by $$\sum_{1}^{N} n_i^2 \quad \text{(equation (6))}$$

or to multiply by the reciprocal value. To this end, $$g_i' = \frac{n_i \cdot w_i}{2^q} \text{ with } \sum_{1}^{N} w_i \cdot n_i = 2^q \quad \text{(equations (7), (8))}$$

are selected, with whole numbers $w_i$ so that the new weights $g'_i$ come as close as possible to the ideal weights $g_i$ according to equation (5). The natural number q here determines the achievable precision.

With a weighting of this kind, all divisions are eliminated; all that is required is a division by the power of two $2^q$, which in a two's complement depiction, is achieved through a simple digit shift by q places to the right. The summation is calculated with q bits, without regard to subtotal arithmetic overflows.

In the example mentioned above ($n_1=13$, $n_2=17$), for q=12 bits, the whole numbers $w_1=115$ and $w_2=153$ can be used. The resulting weighting factors thus diverge by approx. 1% from the ideal value according to equation (5). Precisely stated, $$g_1' + g_2' = \frac{w_1 \cdot n_1}{2^q} + \frac{w_2 \cdot n_2}{2^q} \quad \text{(equation (9))}$$

$$= \frac{115 \cdot 13}{4096} + \frac{153 \cdot 17}{4096}$$

$$= \frac{4096}{4096}$$

$$= 1$$

If $n_1$ and $n_2$ are not prime numbers so that they share a common divisor L, where $$L = GGT(n_1, n_2) > 1, \quad \text{(equation (10))}$$

then the method described above can also be used. In lieu of the periodicities, the values divided by L must then used. As a result in this case, this yields an estimate for L-times the angular value $\Phi$.

Figure 2:
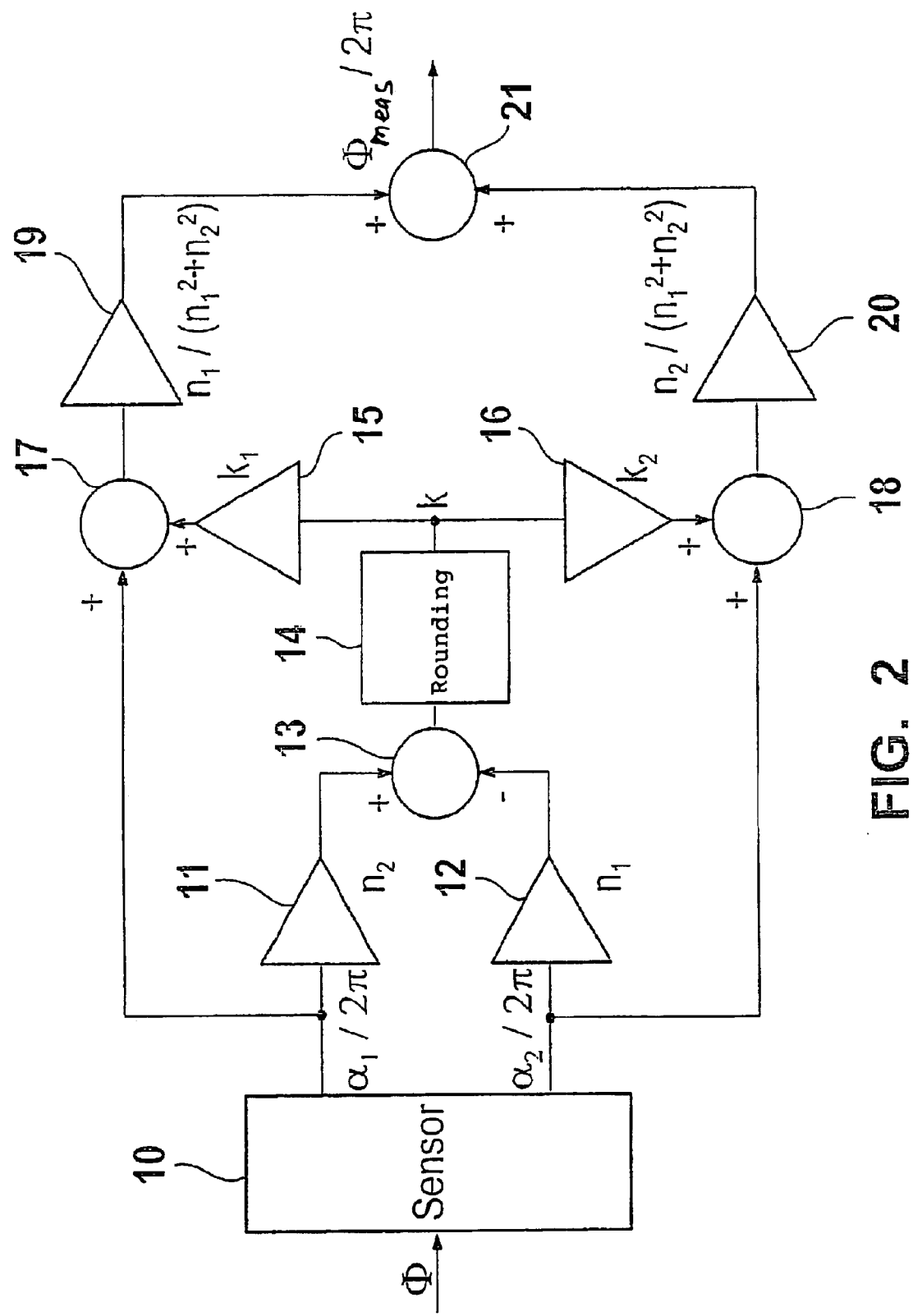
FIG. 2 is a block circuit diagram of a first preferred embodiment of the device or circuit according to the invention, which can execute the method according to the invention.
Figure 4:
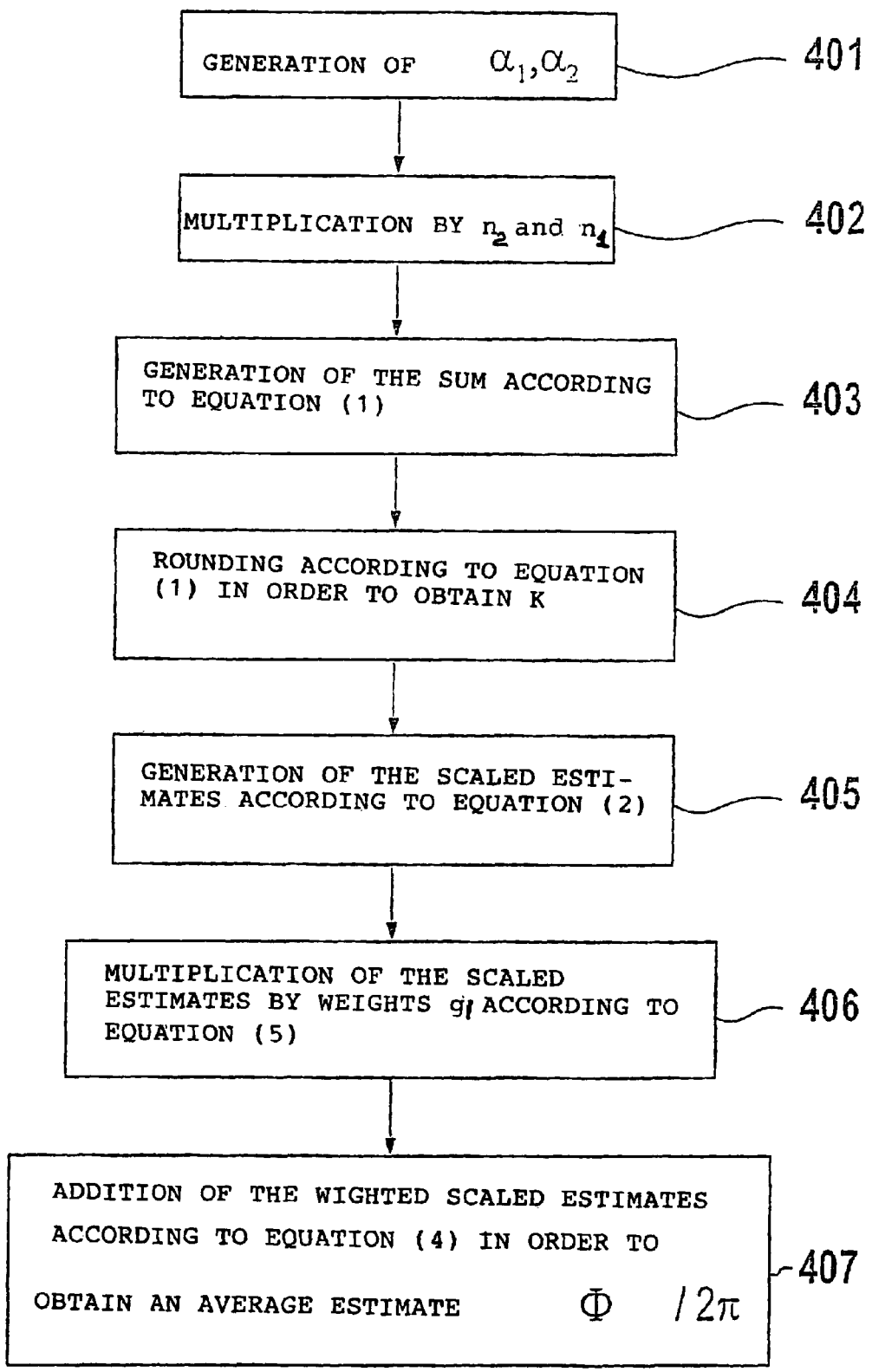
FIG. 4 shows a flowchart to further explain a preferred embodiment of the method according to the invention.

FIG. 2 shows a preferred circuit for executing the method according to the invention. For illustrative purposes, please see FIG. 4 in this connection, which depicts a flowchart of the embodiment of the method according to the invention that is executed with the circuit.

The sensing means or the sensor labeled 10 in FIG. 2 supplies the two phase values $\alpha_1$ and $\alpha_2$ (step 401). In multiplication elements 11 and 12, these measurement signals, which are scaled through division by $2\pi$, are multiplied by the periodicities of the individual tracks of the sensor 10, $n_2$ and $n_1$ (step 402). The summation according to equation (1) is executed in a summation element (step 403). The rounding according to equation (1) then takes place in a rounding element 14 (step 404). In order to obtain the two scaled estimates $\Phi_{s1}/2\pi$ and $\Phi_{s2}/2\pi$, the working value k generated by means of the rounding element 14 is first multiplied by the values $k_1$ and $k_2$. As has been mentioned above, the values $k_1$ and $k_2$ can be selected according to equation (3). In order to obtain the respective numerator on the right side of equation (2), the phase values $\alpha_1/2\pi$ and $\alpha_2/2\pi$ are added to the outputs of the multiplication elements 15 and 16 in summation elements 17 and 18. The execution of the calculating steps according to equation (2) takes place in step 405 in the flowchart. The multiplication by the weights $g_i$ according to equation (5) takes place in multiplication elements 19 and 20 (step 406). The output values of the multiplication elements 19 and 20 are supplied to an adding element 21, by means of which the value $\Phi_{meas}/2\pi$ according to equation (4) can be determined (step 407).

Figure 3:
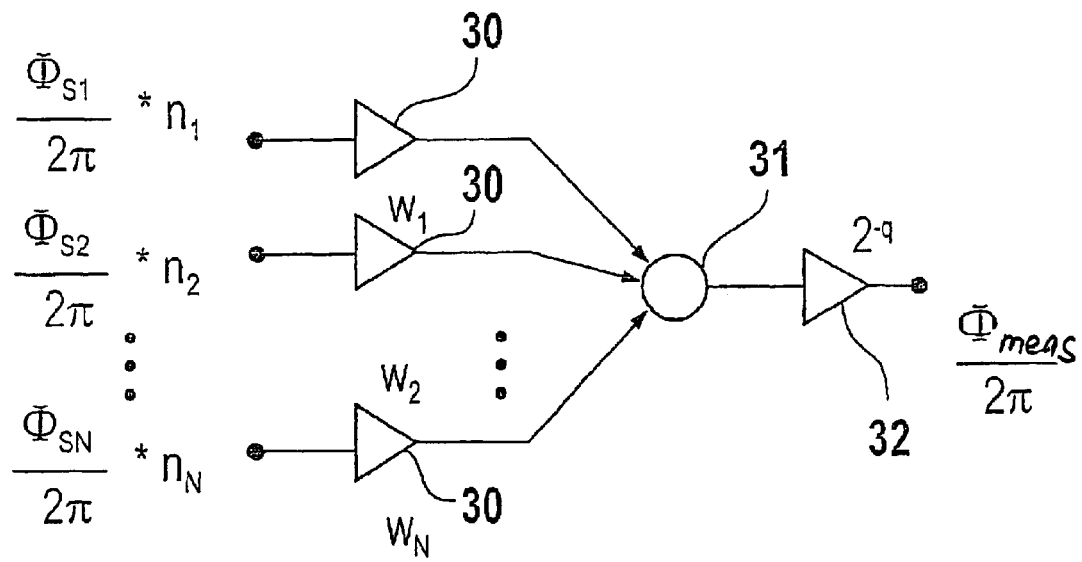
FIG. 3 shows a preferred embodiment of a circuit for producing weighted sums for a system with N phase signals.

FIG. 3 shows a circuit for producing the weighted sum with the weights $g'_i$ according to equation (7) for a system with N phase signals. It is evident that the respective scaled estimates $\phi_{si}/2\pi$ are first multiplied by the respective periodicities $n_i$. The respective multiplication by the whole numbers $w_i$ is carried out in subsequent multiplication elements 30. The output values of the multiplication elements 30 are added up in a summation element 31; the resulting sum is multiplied (according to equation (7)) by the value $2^{-q}$ in a multiplication element 32. The value thus obtained is the value $\Phi_{meas}/2\pi$ according to equation (4) with the weights g according to equation (7).

The method according to the invention can achieve the advantages of the modified vernier method mentioned in the introduction to the specification and these advantages are further improved by the weighting proposed according to the invention.

What is claimed is:

1. A method for determining a rotation angle or a path, with the following steps:

generation of at least two phase values $\alpha_i$ (i=1, 2 ... N) through the scanning of sensing means associated with the respective phase values and having different periodicities $n_i$, calculation of a working value k, which can be represented as a whole number, on the basis of the measured phase values $\alpha_i$ and the periodicities $n_i$ associated with them, calculation of at least two—in particular scaled—estimates $\phi_{s1}/2\pi$ on the basis of the phase values $\alpha_i$, the periodicities $n_i$, the working value k, and integral working factors $k_i$ that set the periodicities $n_i$ in relation to one another in a scaling relation, and weighted summation of the estimates $\phi_{s1}/2\pi$ in order to obtain a determined estimate $\Phi_{meas}/2\pi$, which represents the rotation angle or path to be determined.

2. The method according to claim 1, characterized in that for the case in which two phase values $\alpha_1$, $\alpha_2$ are supplied, the working value k is calculated by rounding the term:

$$\left[ \frac{\alpha_1 \cdot n_2 - \alpha_2 \cdot n_1}{2 \cdot \pi} \right]$$

where $n_1$ is the periodicity of the sensor (10) associated with the phase value $\alpha_1$, and $n_2$ is the periodicity of the sensor (10) associated with the phase value $\alpha_2$.

3. The method according to claim 1, characterized in that for the case in which two phase values $\alpha_1$, $\alpha_2$ are supplied, the scaling relation of the periodicities $n_1$, $n_2$ is selected as $k_2 \cdot n_1 - k_1 \cdot n_2 = 1$.

4. The method according to claim 1, characterized in that the scaled estimates are calculated according to an equation with the form:

$$\frac{\Phi_{s_i}}{2 \cdot \pi} = \frac{\frac{\alpha_i}{2 \cdot \pi} + k \cdot k_i}{n_i}.$$

5. The method according to claim 1, characterized in that the weighted summation of the at least two scaled estimates is calculated according to an equation with the form:

$$\frac{\Phi_{meas}}{2 \cdot \pi} = \sum_{i=1}^{N} \left[ \frac{\Phi_{s_i}}{2 \cdot \pi} \cdot g_i \right]_{mod(1)}$$

where the $g_i$'s represent weighting factors for which the following equation applies:

$$\sum_{i=1}^{N} g_i = 1.$$

6. The method according to claim 5, characterized in that for the case in which two phase values $\alpha_1$, $\alpha_2$ are supplied, the weighting factors $g_1 = g_2 = 0.5$ are used.

7. The method according to claim 5, characterized in that the weighting factors are calculated according to a relation with the form:

$$g_i = \frac{n_i^2}{\sum_{1}^{N} n_i^2}.$$

8. The method according to claim 5, characterized in that the weighting factors $g_i$ are calculated according to a relation with the form:

$$g'_i = \frac{n_i \cdot w_i}{2^q} \text{ with } \sum_{i=1}^{N} w_i \cdot n_i = 2^q,$$

where the $w_i$'s represent whole numbers, which are selected in such a way that the $g_i$'s approximate the $g_i$ as closely as possible.

9. A device for determining a rotation angle or a path, with means for generating at least two phase values $\alpha_1$ (i=1, 2, ... N) through the scanning of sensors (10) that are associated with the respective phase values and have different periodicities $n_i$, means (13, 14) for calculating a working value k, which can be represented as a whole number, on the basis of the measured phase values $\alpha_1$ and the periodicities $n_i$ associated with them, means (15, 16, 17, 18) for calculating at least two—in particular scaled—estimates $\phi_{s1}/2\pi$ on the basis of the phase values $\alpha_i$, the periodicity $n_i$, the working value k, and integral working factors $k_i$ that set the periodicities $n_i$ in relation to one another in a scaling relation, and means (21) for a weighted summation of the scaled estimates in order to obtain a determined estimate $\Phi_{meas}/2\pi$, which represents the rotation angle or path to be determined.

* * * * *